(12) United States Patent
Lee et al.

(10) Patent No.: US 11,066,043 B2
(45) Date of Patent: Jul. 20, 2021

(54) VEHICLE AND METHOD OF CONTROLLING THE SAME

(71) Applicants: HYUNDAI MOTOR COMPANY, Seoul (KR); KIA MOTORS CORPORATION, Seoul (KR)

(72) Inventors: SeokHan Lee, Seoul (KR); KyuHwan Chin, Seoul (KR); Sinjung Kim, Suwon-si (KR); Yongho Shin, Anyang-si (KR); Sang Woo Ji, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 45 days.

(21) Appl. No.: 16/580,225

(22) Filed: Sep. 24, 2019

(65) Prior Publication Data

US 2020/0172055 A1 Jun. 4, 2020

(30) Foreign Application Priority Data

Dec. 4, 2018 (KR) .......................... 10-2018-0154511

(51) Int. Cl.
*B60R 25/24* (2013.01)
*H04W 4/40* (2018.01)
*H04W 12/06* (2021.01)

(52) U.S. Cl.
CPC ............... *B60R 25/24* (2013.01); *H04W 4/40* (2018.02); *H04W 12/06* (2013.01); *B60R 2325/205* (2013.01)

(58) Field of Classification Search
CPC .... B60R 25/24; B60R 2325/205; H04W 4/40; H04W 12/06
See application file for complete search history.

(56) References Cited

U.S. PATENT DOCUMENTS

| | | | |
|---|---|---|---|
| 2014/0282947 A1* | 9/2014 | Ignatchenko | H04L 63/08 726/6 |
| 2017/0129457 A1* | 5/2017 | Lee | B60R 25/248 |
| 2017/0190316 A1* | 7/2017 | Kim | B60R 25/24 |
| 2020/0070758 A1* | 3/2020 | Cockings | B60R 16/037 |

\* cited by examiner

*Primary Examiner* — Nabil H Syed
(74) *Attorney, Agent, or Firm* — Mintz Levin Cohn Ferris Glovsky and Popeo, P.C.; Peter F. Corless

(57) ABSTRACT

Provided is a vehicle including: a communication unit configured to communicate with a user terminal; and a control unit configured to, upon receiving a response signal including terminal information of the user terminal from the user terminal, determine an authentication allowed time for authenticating the user terminal on the basis of the terminal information, generate user information including the terminal information and the authentication allowed time corresponding to the terminal information, and authenticate the user terminal on the basis of the generated user information.

18 Claims, 6 Drawing Sheets

VEHICLE AND METHOD OF CONTROLLING THE SAME

CROSS-REFERENCE TO RELATED APPLICATION

This application is based on and claims priority under 35 U.S.C. § 119 to Korean Patent Application No. 10-2018-0154511, filed on Dec. 4, 2018 in the Korean Intellectual Property Office, the disclosure of which is incorporated herein by reference.

BACKGROUND

1. Field

The present disclosure relates to a vehicle capable of communicating with a user terminal and a method of controlling the same.

2. Description of the Related Art

A remote control system of a vehicle is a technology that enables a vehicle door to be opened and closed and the vehicle to be started from the outside of the vehicle without a driver inserting a key into a key box of the vehicle or performing any specific manipulation. In this regard, smart cards with easy of portability, FOBs for wireless communication, and other many technologies using a handheld-based user terminal for controlling a vehicle have been developed.

The disclosure of this section is to provide background of the invention. Applicant notes that this section may contain information available before this application. However, by providing this section, Applicant does not admit that any information contained in this section constitutes prior art.

SUMMARY

Therefore, aspects of the present disclosure provide a vehicle capable of communicating with a user terminal and a method of controlling the same.

Additional aspects of the invention will be set forth in part in the description which follows and, in part, will be obvious from the description, or may be learned by practice of the invention.

Therefore, one aspect of the present invention provides a vehicle including: a communication unit configured to communicate with a user terminal; and a control unit configured to, upon receiving a response signal including terminal information of the user terminal from the user terminal, determine an authentication allowed time for authenticating the user terminal on the basis of the terminal information, generate user information including the terminal information and the authentication allowed time corresponding to the terminal information, and authenticate the user terminal on the basis of the generated user information.

The control unit may determine a first compensation time on the basis of the terminal information and determine the authentication allowed time on the basis of the first compensation time and a reference time that is determined in advance.

The reference time may be determined on the basis of a type of the vehicle.

The control unit may calculate an average value of each authentication elapsed time taken from a point in time at which a search signal is transmitted to a point in time at which the response signal is received, determine a second compensation time on the basis of the average value, and determine the authentication allowed time on the basis of the second compensation time.

The control unit may determine the second compensation time as a value of the average value of the authentication elapsed time minus a sum of the reference time and the first compensation time.

The control unit may determine the authentication allowed time corresponding to the terminal information on the basis of the user information, compare the authentication allowed time with an elapsed time taken from a point in time at which the search signal is transmitted to a point in time at which the response signal is received, and authenticate the user time on the basis of a result of the comparison.

The control unit may determine that a relay attack has occurred when the elapsed time exceeds the authentication allowed time.

The vehicle may further include a storage unit, wherein the control unit may control the storage unit to store the generated user information.

The control unit may determine whether to register the user terminal on the basis of the generated user information, and authenticate the user terminal on the basis of the generated user information in response to the user terminal being registered.

The vehicle may further include an input unit, wherein a user is requested to tag the user terminal in response to a user terminal registration command received or in response to the user terminal not registered.

Another aspect of the present invention provides a method of controlling a vehicle, the method including: receiving a response signal including terminal information of a user terminal from the user terminal; determining an authentication allowed time for authenticating the user terminal on the basis of the terminal information; generating user information including the terminal information and the authentication allowed time corresponding to the terminal information; and authenticating the user terminal on the basis of the generated user information.

The determining of the authentication allowed time may include determining a first compensation time on the basis of the terminal information and determining the authentication allowed time on the basis of the first compensation time and a reference time that is determined in advance;

The reference time may be determined on the basis of a type of the vehicle.

The determining of the authentication allowed time may include: calculating an average value of each authentication elapsed time taken from a point in time at which a search signal is transmitted to a point in time at which the response signal is received; determining a second compensation time on the basis of the average value; and determining the authentication allowed time on the basis of the second compensation time.

The determining of the second compensation time may include determining the second compensation time as a value of the average value of the authentication elapsed time minus a sum of the reference time and the first compensation minus.

The authenticating of the user terminal may include: determining the authentication allowed time corresponding to the terminal information on the basis of the user information; comparing the authentication allowed time with an elapsed time taken from a point in time at which the search signal is transmitted to a point in time at which the response signal is received; and authenticating the user time on the basis of a result of the comparison.

The authenticating of the user terminal on the basis of the result of the comparison may include determining that a relay attack has occurred when the elapsed time exceeds the authentication allowed time.

The method may further include storing the generated user information.

The method may further include determining whether to register the user terminal on the basis of the generated user information, wherein the authenticating of the user terminal may include authenticating the user terminal on the basis of the generated user information in response to the user terminal registered.

The method may further include requesting a user to tag the user terminal in response to a user terminal registration command received or in response to the user terminal not registered.

Aspects of the invention provide a method of controlling communication between a vehicle and a user's terminal, the method comprising: sending a search signal; receiving a response signal in response to the search signal from a user terminal, the response signal including terminal information of the user terminal; determining authentication processing time from sending the search signal to the receipt of a response signal; comparing the authentication processing time with an authentication allowed time pre-determined based on the terminal information; and authenticating the user terminal based on the terminal information and the comparison result.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
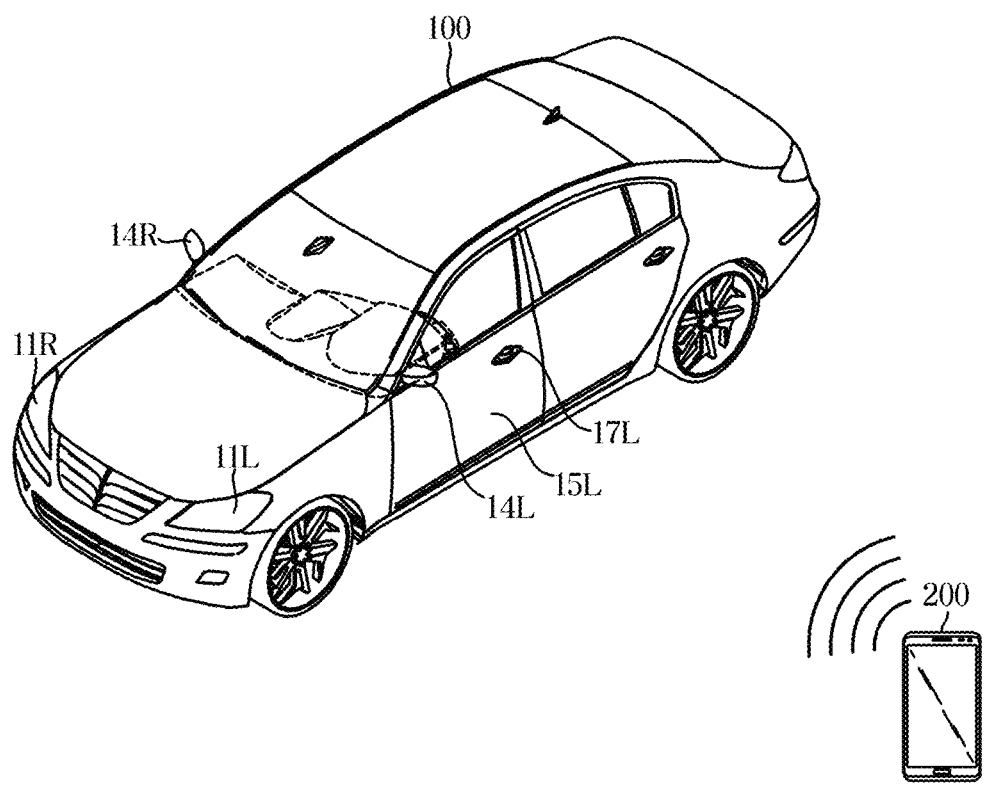
FIG. 1 is a view illustrating a remote control system according to an embodiment.

Like numerals refer to like elements throughout the specification. Not all elements of embodiments of the present disclosure will be described, and description of what are commonly known in the art or what overlap each other in the embodiments will be omitted. The terms as used throughout the specification, such as "~ part", "~ module", "~ member", "~ block", etc., may be implemented in software and/or hardware, and a plurality of "~ parts", "~ modules", "~ members", or "~ blocks" may be implemented in a single element, or a single "~ part", "~ module", "~ member", or "~ block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless the context clearly indicates otherwise.

Although the terms "first," "second," "A," "B," etc. may be used to describe various components, the terms do not limit the corresponding components, but are used only for the purpose of distinguishing one component from another component.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

Hereinafter, the principles and embodiments of the disclosure will be described with reference to the accompanying drawings.

Technologies for controlling a vehicle using a user terminal often suffer from hacking into radio signals that collect an authentication request signal from a vehicle through an antenna or the like near the vehicle, transmit the collected authentication request signal to a user terminal existing at a remote site from the vehicle, and allow the user terminal to transmit a response signal to the vehicle.

FIG. 1 is a view illustrating a remote control system according to an embodiment.

Referring to FIG. 1, in embodiments, a remote control system 1 according to an embodiment includes a vehicle 100 and a user terminal 200.

The vehicle 100 may receive various signals including a control signal from the user terminal 200 to provide various user convenience functions, such as a user remote control through the user terminal 200.

For example, when a touch sensor unit of doors 15L and 15R senses a user's touch input in a state in which the user is holding the user terminal 200 registered in the vehicle 100, the vehicle 100 performs authentication with the user terminal 200 through a wireless communication network, and when the authentication is completed, door lock of the vehicle 100 is released so that the door 15L may be opened through a user manipulation of pulling handles 17L and 17R. Here, the user may include not only a driver but also a passenger being aboard the vehicle 100, and refer to a person who owns the user terminal 200.

When the user disposes the user terminal 200 registered in the vehicle 100 within a predetermined range of a predetermined area of the vehicle 100, the vehicle 100 performs authentication on the user terminal 200 through the wireless communication network, and when the authentication is completed, door lock of the vehicle 100 may be released or ignition of the vehicle 100 may be turned on.

Here, the predetermined area of the vehicle 100 may be set to the outside or inside of the vehicle 100 in advance. For example, the user may perform authentication on the user terminal 200 by disposing the user terminal 200 within a predetermined distance from the handles 17L and 17R of the vehicle 100 or from the center fascia inside the vehicle 100, and when the authentication is completed, the user may open the door 15L of the vehicle 100 or turn on the ignition of the vehicle 100.

When confirming that the user terminal 200 is located in proximity to the vehicle 100, the vehicle 100 may provide a welcome light function of turning on headlights 11L and 11R or lamps provided on the handles 17L and 17R of the vehicle 100.

In order to provide such various user convenience functions, the vehicle 100 may transmit various signals including a search signal for sensing the user terminal 200 to the user terminal 200, and may receive, from the user terminal 200, a response signal or various control signals in response to the transmitted signals.

The vehicle 100 and the user terminal 200 may be connected to each other through a local area network. Herein, the local area network includes a wireless LAN, a Wi-Fi, a Bluetooth, a zigbee, a Wi-Fi direct (WFD), an ultra-wideband (UWB), an infrared data association (IrDA), bluetooth low energy (BLE), near field communication (NFC), and radio frequency identification (RFID), and the like, but the implementation of the local area network is not limited thereto.

Meanwhile, the user terminal 200 may be implemented as a computer or a portable terminal capable of connecting to the vehicle 100 through a network. Here, the computer may include, for example, a notebook computer, a desktop computer, a laptop PC, a tablet PC, a slate PC, and the like, each of which is equipped with a WEB Browser. The portable terminal is a wireless communication device mobility, and may include: all types of handheld based wireless communication devices, such as a personal communication system (PCS), a global system for mobile communications (GSM), a personal digital cellular (PDC), a personal handyphone system (PHS), a personal digital assistant (PDA), an international mobile telecommunication (IMT)-2000, a code division multiple access (CDMA)-2000, a w-code division multiple access (W-CDMA), a wireless broadband internet (WiBro) terminal, a smart Phone, and the like; and wearable devices, such as a watch, a ring, a bracelet, an ankle bracelet, a necklace, glasses, a contact lens, or a head-mounted-device (HMD).

Figure 2:
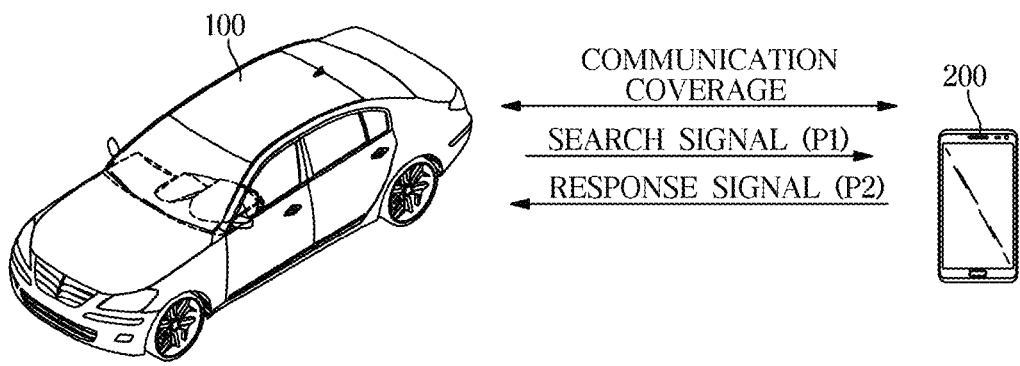
FIGS. 2 and 3 are views for describing an authentication procedure performed between a vehicle and a user terminal in a transmitting/receiving range of various signals.
Figure 3:
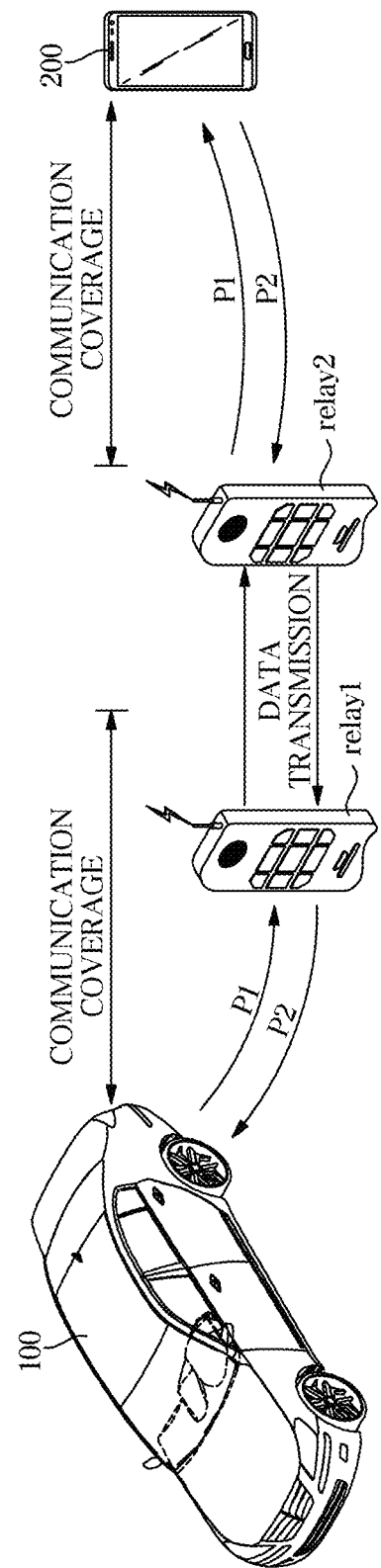

FIGS. 2 and 3 are views for describing an authentication procedure performed between a vehicle and a user terminal in a transmitting and receiving range of various signals.

Referring to FIG. 2, when the user terminal 200 is located within a communication coverage of the vehicle 100, the user terminal 200 may receive a search signal Pl from the vehicle 100 and may transmit, to the vehicle 100, a response signal P2 corresponding to the search signal P1.

The vehicle 100 having received the response signal P2 may sense the user terminal 200 and may estimate the position of the user terminal 200 on the basis of the response signal P2.

In addition, the vehicle 100 may authenticate the user terminal 200 on the basis of the response signal P2 received from the user terminal 200.

To this end, the vehicle 100 may transmit the search signal P1 including a test value to the user terminal 200, and may determine whether a result value included in the response signal P2 received from the user terminal 200 corresponds to the test value.

The vehicle 100 may authenticate the user terminal 200 when the result value of the response signal P2 received from the user terminal 200 corresponds to the test value of the search signal P1.

In embodiments, when the vehicle 100 receives the response signal P2 including the result value corresponding to the test value of the transmitted search signal P1, the vehicle 100 may authenticate the user terminal 200 having transmitted the response signal P2.

On the other hand, the communication coverage may be determined on the basis of the communication network that is used by the user terminal 200 and the vehicle 100 to perform communication. For example, the vehicle 100 and the user terminal 200 may be connected to each other through a local area network, and in more detail, may transmit and receive signals through a local area network using NFC communication. In this case, the communication coverage may refer to a range in distance where NFC communication is performed.

In this case, the search signal P1 may refer to an NFC discovery signal, and the response signal P2 may refer to an NFC response signal corresponding to an NFC discovery signal transmitted from the user terminal 200.

On the other hand, when the user terminal 200 does not exist within the communication coverage of the vehicle 100, even when the vehicle 100 transmits a search signal or an authentication signal within the communication coverage, the user terminal 200 may not receive the search signal or the authentication signal. Accordingly, the user terminal 200 may not transmit a response signal to the vehicle 100, and the vehicle 100 does not perform authentication on the user terminal 200.

However, even when the user terminal 200 does not exist within the communication coverage, there is a case in which authentication of the user terminal 200 is performed.

For example, referring to FIG. 3, even when the user terminal 200 does not exist within the communication coverage, a relay (relay2 or relay3) that attempts hacking is involved with communication between the vehicle 100 and the user terminal 200, authentication of the user terminal 200 may be performed.

In detail, a signal from the vehicle 100 may be transmitted to the user terminal 200 or a signal from the user terminal 200 may be transmitted to the vehicle 100 through a first relay (relay 1) existing within a communication coverage of the vehicle 100 and a second relay (relay2) existing within a communication coverage of the user terminal 200.

In this case, a search signal P1 transmitted from the vehicle 100 may be received by the first relay (relay 1), and the first relay (relay 1) may transmit the received search signal P1 to the second relay (relay 2). The second relay 2 (relay 2) may transmit the received search signal P1 to the user terminal 200 within the communication coverage of the user terminal 200.

The user terminal 200 may transmit a response signal P2 corresponding to the search signal P1 to the second relay (relay2), the second relay (relay 2) may transmit the response signal P2 received from the user terminal 200 to the first relay (relay 1), and then the first relay (relay1) may transmit the received response signal P2 to the vehicle 100, so that an authentication process may be completed in an abnormal way. Then, it is determined that a relay attack may occur.

In this case, data transmission between the first relay (relay 1) and the second relay (relay 2) may be performed using a communication network having a wider range than with the communication coverage. For example, when the communication coverage corresponds to a local area network using NFC, the data transmission process between the first relay (relay 1) and the second relay (relay 2) may be performed not only with communication networks using wireless LAN, Wi-Fi, and Bluetooth, but also with other communication networks using various wireless communication methods based on code division multiple access (CDMA), wideband code division multiple access (WCDMA), universal mobile telecommunications system (UMTS), time division multiple access (TDMA), and a long term evolution (LTE).

Accordingly, there is a need to distinguish between a case in which authentication of the user terminal 200 is normally performed and a case in which authentication of the user terminal 200 is abnormally performed with the relays involved in the authentication process.

In addition, since the communication environment may vary for each model of the user terminal 200, the distinguishing between the normal authentication process of the user terminal 200 and the abnormal authentication process with involvement of the relays needs to be performed in consideration of a specific usage environment where the user uses the user terminal 200.

Figure 4:
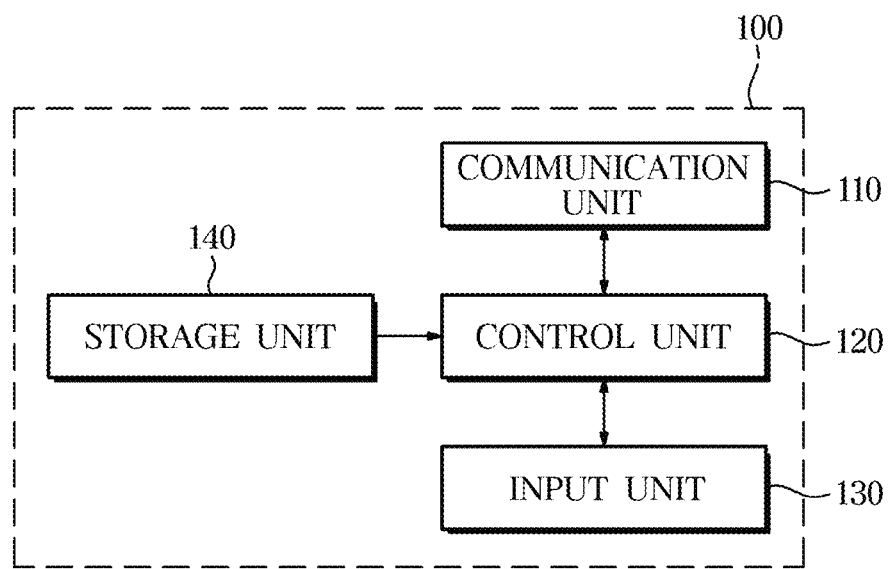
FIG. 4 is a control block diagram illustrating a vehicle according to an embodiment.

FIG. 4 is a control block diagram illustrating the vehicle 100 according to the embodiment.

Referring to FIG. 4, the vehicle 100 according to the embodiment includes a communication unit 110, a storage unit 130, and a control unit 120.

The communication unit 110 may communicate with the user terminal 200, and may transmit and receive various signals to/from the user terminal 200.

For example, the communication unit 110 may transmit a search signal to the user terminal 200 to sense the user terminal 200, and may receive a response signal corresponding to the search signal from the user terminal 200.

In addition, the communication unit 110 may transmit an authentication request signal to the user terminal 200 to authenticate the user terminal 200, and may receive an authentication response signal corresponding to the authentication request signal from the user terminal 200.

To this end, the communication unit 110 may include at least one component that enables communication with an external device, for example, at least one of a short-range communication module, a wired communication module, and a wireless communication module.

The short-range communication module may include various short-range communication modules that transmit and receive signals using a wireless communication network in a short range, such as a Bluetooth module, an infrared communication module, a radio frequency identification (RFID) communication module, a wireless local access network (WLAN) communication module, an NFC communication module, and a zigbee communication module.

The wired communication module may include various wired communication modules, such as a controller area network (CAN) communication module, a local area network (LAN) module, a wide area network (WAN) module, or a value added network communication (VAN) module, and various cable communication modules, such as a universal serial bus (USB) module, a high definition multimedia interface (HDMI) module a digital visual interface (DVI) module, a recommended standard-232 (RS-232) module, a power line communication module, or a plain old telephone service (POTS) module.

The wireless communication module may include wireless communication modules supporting various wireless communication methods, such as a Wifi module, a wireless broadband module (Wibro) module, a global system for mobile communication (GSM) module, a code division multiple access (CDMA) module, a wideband code division multiple access (WCDMA) module, a universal mobile telecommunications system (UMTS) module, a time division multiple access (TDMA) module, a long term evolution (LTE) module, and the like.

The wireless communication module may include a wireless communication interface including an antenna and a transmitter for transmitting signals. In addition, the wireless communication module may further include a signal converting module for converting a digital control signal output from the control unit through the wireless communication interface into an analog type wireless signal under the control of the control unit.

The wireless communication module may include a wireless communication interface including an antenna and a receiver for receiving signals. In addition, the wireless communication module may further include a signal converting module for demodulating an analog type wireless signal received through the wireless communication interface into a digital control signal.

When the control unit 120 senses the user terminal 200, e.g., upon receiving a response signal corresponding to a search signal from the user terminal 200, the control unit 120 may perform authentication on the user terminal 200.

In detail, the control unit 120 may authenticate the user terminal 200 on the basis of user information generated in advance. In this case, the user information may refer to information for authenticating the user terminal 200, and in more detail, refer to information about a usage environment of the user terminal 200. The user information may include information about a usage environment personalized for each user. For example, the user information may include at least one of terminal information of the user terminal 200, type information of the vehicle 100, a first compensation time, a second compensation time, or an authentication allowed time. In addition, the user information may include at least one of terminal, type information of the vehicle 100, a first compensation time, a second compensation time, or an authentication allowed time information, of each user. Details thereof will be described below.

When the control unit 120 senses the user terminal 200, the control unit 120 may determine an authentication allowed time on the basis of terminal information received from the user terminal 200. In one example, when the control unit 120 receives a response signal corresponding to a search signal from the user terminal 200, the control unit 120 may determine an authentication allowed time on the basis of terminal information included in the response signal.

In this case, the authentication allowed time refers to an authentication time that serves as a reference for determining whether a relay attack against the user terminal 200 has occurred.

In addition, the terminal information is information related to the user terminal 200 for identifying the user terminal 200, and may include unique identification information of the user terminal 200.

The control unit 120 may determine the authentication allowed time corresponding to the terminal information received from the user terminal 200 on the basis of the user information generated in advance, and may authenticate the user terminal 200 on the basis of the determined authentication allowed time.

In detail, the control unit 120 may compare an authentication elapsed time taken to authenticate the user terminal 200 with the authentication allowed time, and may authenticate the user terminal 200 on the basis of a result of the comparison.

To this end, the control unit 120 may determine an elapsed time from the point in time at which a search signal is transmitted to the user terminal 200 to the point in time at which a response signal corresponding to the search signal is received from the user terminal 200 as the authentication elapsed time.

When the authentication elapsed time exceeds the authentication allowed time, the control unit 120 may determine that a relay attack has occurred. Then, the control unit 120 may not authenticate the user terminal 200, and may prevent or stop the above-described remote control function.

When the authentication elapsed time does not exceed the authentication allowed time, the control unit 120 may determine that the authentication is completed. For example, the control unit 120 may authenticate the user terminal 200 and may determine that the authentication of the user terminal 200 is normally completed.

Meanwhile, when the user uses the remote control function for the vehicle 100 through the user terminal 200, the communication environment may vary depend on the model of the user terminal 200 or the specific usage environment. Accordingly, the authentication elapsed time, based on which authentication is performed on the user terminal 200, may vary depending on the communication environment.

In order to authenticate the user terminal 200 by reflecting the specific usage environment of the user terminal 200, the control unit 120 may generate the user information for estimating the usage environment of each user.

Hereinafter, an operation of generating the user information of the control unit 120 will be described in detail.

The control unit 120 may determine an authentication allowed time for authenticating the user terminal 200 on the basis of terminal information, and may generate user information including the terminal information and the authentication allowed time corresponding to the terminal information.

To this end, the control unit 120 may determine a first compensation time to compensate for a predetermined reference time on the basis of the terminal information, and may determine the authentication allowed time on the basis of the first compensation time.

In this case, the predetermined reference time may be determined on the basis of the type of the vehicle 100. This is because the communication environment may vary with a communication module installed in each vehicle, such as an antenna and the like. For example, the reference time may be set to 400 ms.

The control unit 120 may determine the first compensation time corresponding to the terminal information on the basis of pre-stored compensation time information.

In this case, the first compensation time refers to a compensation time for compensating for the difference between communication environments depending on models of the user terminal 200 while compensating for a delay of a communication time caused by diversification of the models of the user terminal 200. The compensation time information may include a difference between a model-specific authentication required time of the user terminal 200 and the reference time.

For example, the compensation time information may be stored in the form of a look-up table including a predetermined number of differences each between an authentication required time for a specific model of the user terminal 200 and the reference time, and may be received from an external server.

The control unit 120 may determine the first compensation time corresponding to the terminal information on the basis of the pre-stored compensation time information, and determine a value of the reference time plus or minus the first compensation time to be the authentication allowed time.

Accordingly, the control unit 120 may determine an authentication allowed time reflecting a difference in communication time based on the type of the vehicle 100, and may determine an authentication allowed time reflecting a difference in communication time based on the model of the user terminal 200 even in the same type of the vehicle 100.

In addition, the control unit 120 may determine a second compensation time to compensate for a difference in communication environment depending on the usage environment of the user terminal 200, and may determine an authentication allowed time on the basis of the second compensation time.

In detail, the control unit 120 may calculate an average value of each authentication elapsed time taken from the point in time at which a search signal is transmitted to the point in time at which a response signal is received, and determine the second compensation time on the basis of the average value.

In this case, the control unit 120 may request a user to tag the user terminal 200 to generating user information, and the user may tag the user terminal 200 to the vehicle 100 a predetermined number of times. In this case, the user may tag the user terminal 200 to a predetermined position inside or outside the vehicle 100, for example, to the center fascia of the vehicle 100.

When the user tags the user terminal 200 by a predetermined number of times, the control unit 120 may receive a response signal from the user terminal 200. The control unit 120 may calculate an average value of each authentication elapsed time taken from the point in time at which a search signal is transmitted to the point in time at which a response signal is received. In this case, the average value may refer to an average value of each authentication elapsed time for a response signal to be received when a predetermined number of tag operations are performed.

The control unit 120 may determine a value of the average value for each authenticating time minus the sum of the reference time and the first compensation time to be the second compensation time, and the second compensation time is expressed as shown in Equation 1.

$$CT2 = T_{avg} - (RT + CT1) \qquad \text{[Equation 1]}$$

In this case, CT2 denotes a second compensation time, $T_{avg}$ denotes an average value of each authentication elapsed time, RT denotes a reference time, and CT1 denotes a first compensation time.

Accordingly, the control unit 120 may determine the authentication allowed time on the basis of the second compensation time that compensates for a difference in communication time due to a difference in actual usage environment of the user terminal 200. In some instances, even in the same model of the user terminal 200, the authentication allowed time may be determined in consideration of a difference in communication time based on the OS environment, the application execution environment, the degree of aging and the process variation of the user terminal 200

In addition, the control unit 120 may determine the authentication allowed time on the basis of the reference time, the first compensation time, and the second compensation time, and the authentication allowed time is expressed by Equation 2 below.

$$AT = RT + CT1 + CT2 \qquad \text{[Equation 2]}$$

In this case, AT denotes an authentication allowed time, CT1 denotes a first compensation time, and CT2 denotes a second compensation time. In particular, CT1 or CT2 may be a positive or negative value, or may be zero.

The control unit 120 may match the authentication allowed time and the terminal information, and may store the terminal information and the authentication allowed time corresponding to the terminal information as user information.

In this manner, the control unit 120 may generate a database from a specific usage environment of a user using the remote control system 1 in consideration of the type of the vehicle 100, the model of the user terminal 200, and the usage environment of the user terminal 200. Accordingly, authentication of the user terminal 200 suitable for each user may be performed, so that convenience for the user may be increased. At the same time, the relay attack may be distinguished on the basis of the specific usage environment of the user, so that the safety may be increased.

Meanwhile, the control unit 120 may check whether the user terminal 200 is registered by checking whether terminal information corresponding to the terminal information of the user terminal 200 exists in the user information, and in response to the user terminal 200 being registered, may authenticate the user terminal 200 on the basis of the user information generated in advance.

When terminal information corresponding to the terminal information of the user terminal 200 exists in the user information, the control unit 120 may confirm that the user terminal 200 is registered. The control unit 120 may determine authentication allowed time on the basis of the user information corresponding to the terminal information, and may authenticate the user terminal 200 on the basis of the authentication allowed time. The description thereof is the same as described above.

When terminal information corresponding to the terminal information of the user terminal 200 does not exist in the user information, the control unit 120 may confirm that the user terminal 200 is not registered. In this case, the control unit 120 may request the user to register the user terminal 200 and may generate the user information including the terminal information of the user terminal 200.

When it is confirmed that the user terminal 200 is not registered or a registration command of the user terminal 200 is received from the user, the control unit 120 may generate user information. The description thereof is the same as described above.

The control unit 120 may include a memory for storing data regarding an algorithm for controlling the operations of the components of the vehicle 100 or a program that represents the algorithm, and a processor that performs the above described operations using the data stored in the memory. In this case, the memory and the processor may be implemented as separate chips. Alternatively, the memory and the processor may be implemented as a single chip.

The storage unit 130 may store the above-described user information and compensation time information. In addition, the storage unit 130 may store various pieces of information related to the vehicle 100, and may store various pieces of information received from the user terminal 200.

To this end, the storage unit 130 may include a nonvolatile memory device, such as a cache, a read only memory (ROM), a programmable ROM (PROM), an erasable programmable ROM (EPROM), an electrically erasable programmable ROM (EEPROM), and a flash memory, a volatile memory device, such as a random access memory (RAM), or other storage media, such as a hard disk drive (HDD), a CD-ROM, and the like, but the implementation of the storage unit 130 is not limited thereto. The storage unit 130 may be a memory implemented as a chip separated from the processor, which will be described below in connection with the control u7nit 120, or may be implemented as a single chip integrated with the processor.

The input unit 140 may receive a registration command of a user terminal from a user. To this end, the input unit 140 may include a hardware device, such as various types of buttons or switches, pedals, keyboards, mouse, track-balls, various levers, handles, or sticks.

In addition, the input unit 140 may include a graphical user interface (GUI), such as a touch pad, for a user input. The GUI may include a software device. The touch pad may be implemented as a touch screen panel (TSP) to form a mutual layer structure together with a display.

In addition, the vehicle 100 may further include a display unit and a speaker.

The display unit may include a cathode ray tube (CRT), a digital light processing (DLP) panel, a plasma display panel, a liquid crystal display (LCD) panel, an electro luminescence (EL) panel, an electrophoretic display (EPD) panel, an electrochromic display (ECD) panel, a light emitting diode (LED) panel or an organic light emitting diode (OLED), but is not limited thereto.

At least one component may be added or omitted to correspond to the performances of the components of the vehicle 100 shown in FIG. 4. In addition, the mutual positions of the components may be changed to correspond to the performance or structure of the system.

Some of the components shown in FIG. 4 may refer to a software component and/or a hardware component, such as a Field Programmable Gate Array (FPGA) and an Application Specific Integrated Circuit (ASIC).

Figure 5:
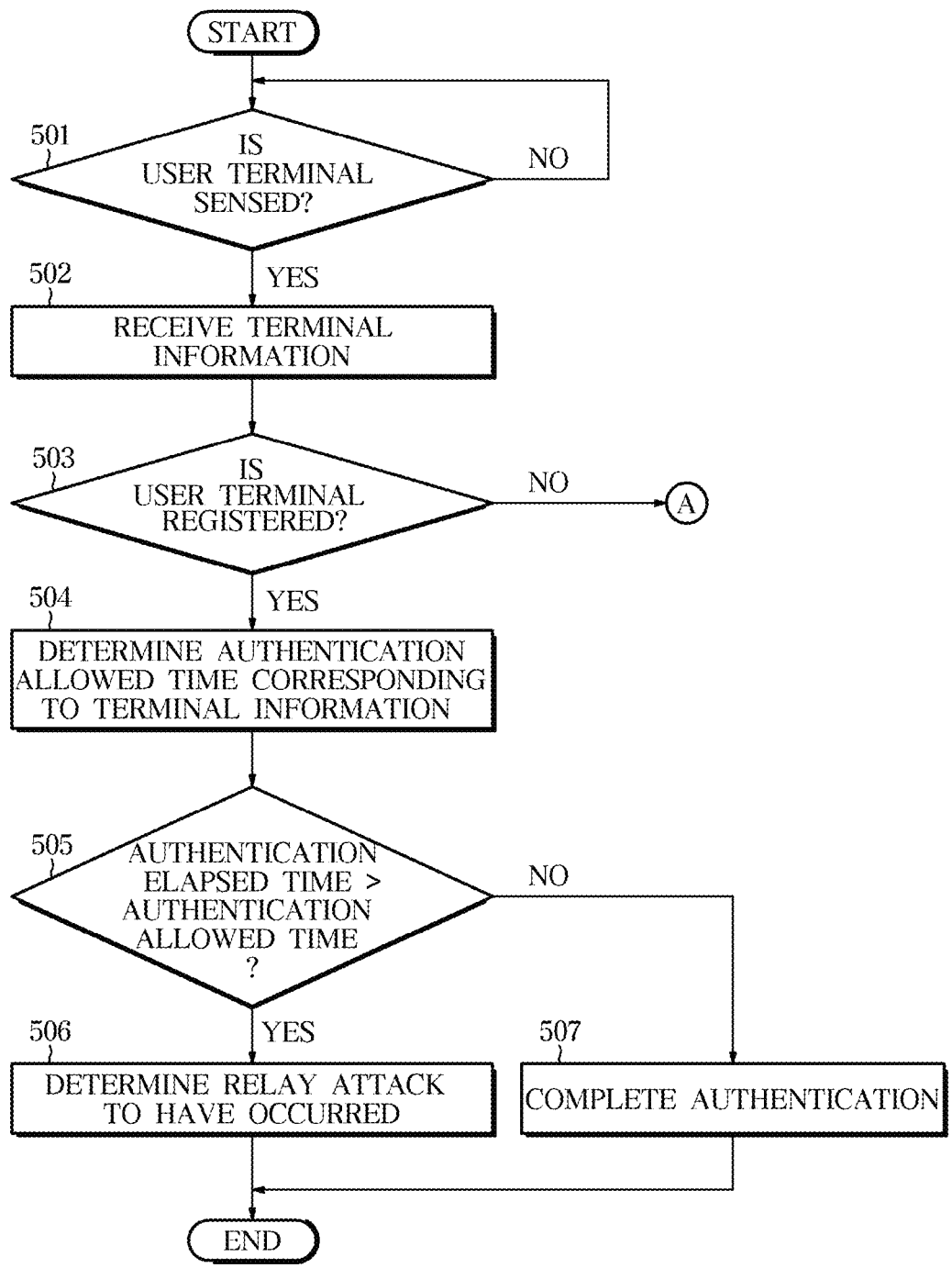
FIG. 5 is a flowchart showing a method of controlling a vehicle according to an embodiment.

FIG. 5 is a flowchart showing a method of controlling a vehicle according to an embodiment.

Referring to FIG. 5, the vehicle 100 according to the embodiment may check whether the user terminal 200 is sensed (501). In detail, the vehicle 100 may confirm that the user terminal 200 is sensed in response to receiving a response signal corresponding to a search signal transmitted to the user terminal 200.

In response to sensing the user terminal 200 (YES in operation 501), the vehicle 100 may receive terminal information from the user terminal 200 (502). In this case, the terminal information is information related to the user terminal 200 for identifying the user terminal 200, and may include unique identification information of the user terminal 200.

In response to receiving the terminal information from the user terminal 200, the vehicle 100 may check whether the user terminal 200 is registered (503).

In detail, the vehicle 100 may check whether the user terminal 200 is registered by checking whether terminal information corresponding to the terminal information of the user terminal 200 exists in user information stored in advance. The vehicle 100 may confirm that the user terminal 200 is registered when terminal information corresponding to the terminal information of the user terminal 200 exists in the user information.

In this case, the user information may refer to information for authenticating the user terminal 200, and in more detail, refer to information about a usage environment of the user terminal 200. The user information may include at least one of terminal information of the user terminal 200, type information of the vehicle 100, a first compensation time, a second compensation time, or an authentication allowed time.

In embodiments, the user information may include information about a usage environment personalized for each user. For example, the user information may include at least one of terminal information, type information of the vehicle 100, a first compensation time, a second compensation time, or an authentication allowed time, of each user.

In response to confirming the registration of the user terminal 200 ((YES in operation 503), the vehicle 100 may determine authentication allowed time corresponding to the terminal information on the basis of the user information (504).

In detail, the vehicle 100 may determine the authentication allowed time corresponding to the terminal information on the basis of the user information. In this case, the authentication allowed time may be a value determined on the basis of at least one of the reference time, the first compensation time, or the second compensation time, and the reference time may be a value determined in advance on the basis of type information of the vehicle 100.

In response to determining the authentication allowed time corresponding to the terminal information, the vehicle 100 may check whether an authentication elapsed time taken to authenticate the user terminal 200 exceeds the authentication allowed time (505). To this end, the vehicle 100 may determine an elapsed time from the point in time at which a search signal is transmitted to the user terminal 200 to the point in time at which a response signal corresponding to the search signal is received from the user terminal 200 as the authentication elapsed time.

When the authentication elapsed time exceeds the authentication allowed time (YES in operation 505), the vehicle 100 may determine that a relay attack has occurred (506). Then, the vehicle 100 may not authenticate the user terminal 200, and may prevent or stop the above-described remote control function. For example, the door lock of the vehicle 100 may be secured or the start of the vehicle 100 may be turned off.

When the authentication elapsed time does not exceed the authentication allowed time (NO in operation 505), the vehicle 100 may complete the authentication (507). The vehicle 100 may authenticate the user terminal 200 and may determine that the authentication of the user terminal 200 is normally completed. In this case, the door lock of the vehicle 100 may be released or the start of the vehicle 100 may be turned on.

As another example, when the user terminal 200 is not registered (NO in operation 503), the vehicle 100 may allow the user terminal 200 to be registered. For example, the vehicle 100 may generate the user information corresponding to terminal information of the user terminal 200. Details thereof will be described below with reference to FIG. 6.

As such, the vehicle 100 may authenticate the user terminal 200 on the basis of the user information regarding the specific usage environment of the user, so that a relay attack may be distinguished using the specific usage environment of the user. Accordingly, the safety may be increased in using a remote control system. In addition, the authentication of the user terminal 200 suitable for each user may be performed, so that the convenience of use may be increased.

Figure 6:
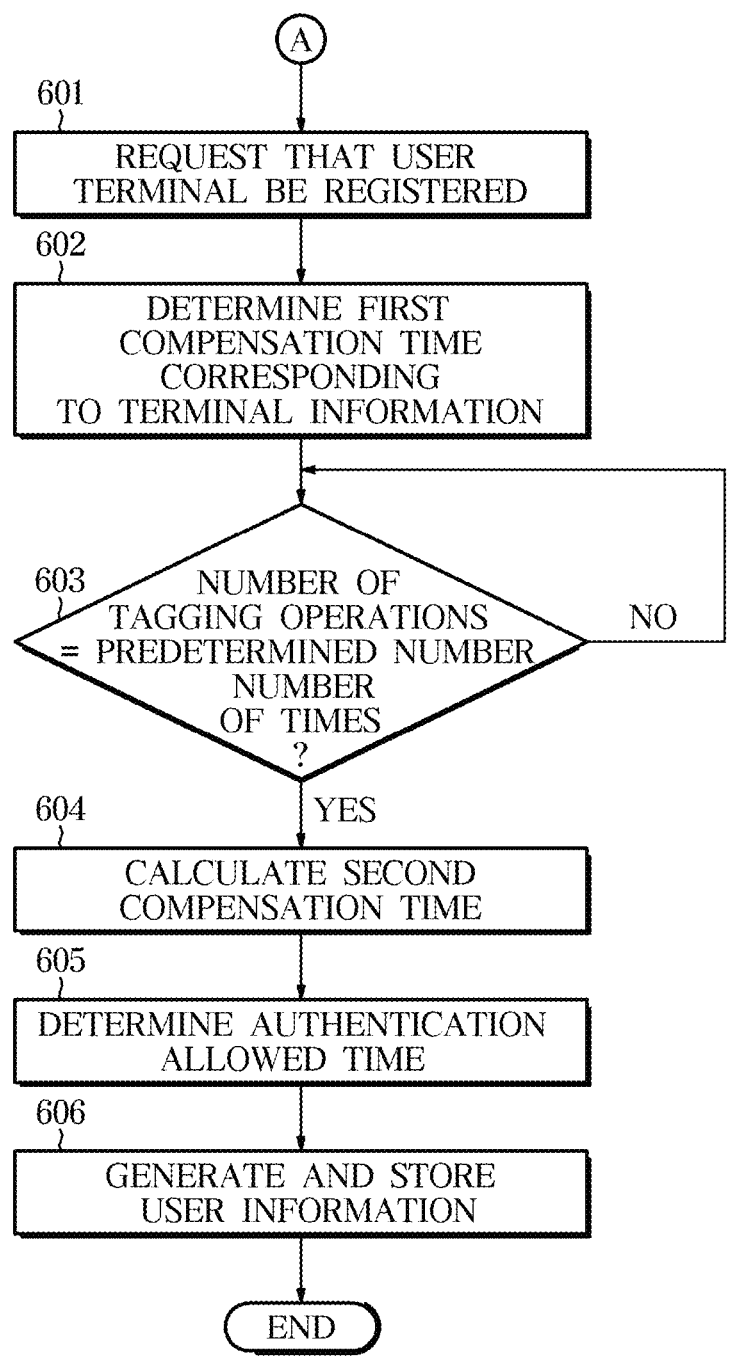
FIG. 6 is a flowchart showing a method of controlling a vehicle according to an embodiment.

FIG. 6 is a flowchart showing the method of controlling the vehicle according to the embodiment.

When it is confirmed that the user terminal 200 is not registered (NO in operation 503 in FIG. 5), the vehicle 100 may request the user to register the user terminal 200 (601).

In this case, the vehicle 100 may request that the user terminal 200 be tagged by a predetermined number of times N together with the request for registering the user terminal. In this case, the user may tag the user terminal 200 to a predetermined position inside or outside the vehicle 100, for example, the user may tag the user terminal 200 to the center fascia of the vehicle 100.

The vehicle 100 may determine a first compensation time corresponding to the terminal information on the basis of pre-stored compensation time information (602).

In this case, the first compensation time refers to a compensation time for compensating for a difference between communication environments depending on models of the user terminal 200, and a time for compensating for a delay of a communication time due to diversification of the models of the user terminal 200. The compensation time information may include a difference between a model-specific authentication required time of the user terminal 200 and the reference time. For example, the compensation time information may be stored in the form of a look-up table including a predetermined number of differences each between an authentication required time for a specific model of the user terminal 200 and the reference time, and may be received from an external server.

Thereafter, the vehicle 100 may check whether the user terminal 200 is tagged by the user a predetermined number of times (603). When the number of times at which the response signal is received from the user terminal 200 when the tag operations for the user terminal 200 are performed the predetermined number of times, the vehicle 100 confirms that the user terminal 200 is tagged by the user.

When the user terminal 200 is tagged by the user the predetermined number of times (YES in 603), the vehicle 100 may calculate a second compensation time (604).

In detail, the vehicle 100 may calculate an average value of each authentication elapsed time taken from the point in time at which a search signal is transmitted to the point in time at which a response signal is received. In this case, the average value may refer to the average value of each authentication elapsed time of the response signal received when the predetermined number of tag operations are performed.

The vehicle 100 may determine a value of the average value of each authentication elapsed time minus the sum of the reference time and the first compensation time to be the second compensation time (604), and may determine the authentication allowed time on the basis of the second compensation time (605).

In detail, the vehicle 100 may determine the authentication allowed time on the basis of the reference time, the first compensation time, and the second compensation time.

When the authentication allowed time is determined, the vehicle 100 may generate user information including the determined authentication allowed time, and store the generated user information (606).

In detail, the vehicle 100 may generate the user information by matching the authentication allowed time and the terminal information, and may store the terminal information and the authentication allowed time corresponding to the terminal information as the user information.

In this case, the vehicle 100 may generate the user information in which the terminal information matches at least one of the reference time, the first compensation time, or the second compensation time, which is used for determining the authentication allowed time corresponding to the terminal information, together with the authentication allowed time.

In embodiments, The vehicle 100 may generate and store user information personalized for each user. For example, the vehicle 100 may generate the user information including at least one of the type information of the vehicle 100, the first compensation time, the second compensation time, or the authentication allowed time, for each user. In this manner, the vehicle 100 may generate a database from a specific usage environment of a user using the remote control system 1 in consideration of the type of the vehicle 100, the model of the user terminal 200, and the usage environment of the user terminal 200.

When the user information is used for authentication of the user terminal 200 as described above with reference to FIG. 5, authentication of the user terminal 200 suitable for each user may be performed. Accordingly, the convenience of the user may be increased. At the same time, a relay attack may be distinguished on the basis of the specific usage environment of the user, so that the safety may be increased.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which can be decoded by a computer are stored, for example, a Read Only Memory (ROM), a Random Access Memory (RAM), a magnetic tape, a magnetic disk, a flash memory, an optical data storage device, and the like.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

As is apparent from the above, the vehicle and the method of controlling the same according to the aspect of the present invention can increase the user convenience and prevent hacking by authenticating a user terminal in consideration of a specific usage environment in which a user uses the user terminal.

Although embodiments of the present invention have been described for illustrative purposes, those skilled in the art will appreciate that various modifications, additions and substitutions are possible, without departing from the scope and spirit of the disclosure. Therefore, embodiments of the present invention have not been described for limiting purposes.

What is claimed is:

1. A vehicle comprising:
   a communication unit configured to communicate with a user terminal; and
   a control unit configured to, upon receiving a response signal including terminal information of the user terminal from the user terminal, determine an authentication allowed time for authenticating the user terminal on the basis of the terminal information, generate user information including the terminal information and the authentication allowed time corresponding to the terminal information, and authenticate the user terminal on the basis of the generated user information,
   wherein the control unit is configured to determine a first compensation time on the basis of a pre-stored compensation time information for each user terminal model and the terminal information and determine the authentication allowed time on the basis of the first compensation time, and
   wherein the pre-stored compensation time information for each user terminal model includes a difference between an authentication required time for each user terminal model and a reference time of the vehicle.

2. The vehicle of claim 1, wherein the reference time is determined on the basis of a type of the vehicle.

3. The vehicle of claim 1, wherein the control unit calculates an average value of each authentication elapsed time taken from a point in time at which a search signal is transmitted to a point in time at which the response signal is received, determines a second compensation time on the basis of the average value, and determines the authentication allowed time on the basis of the second compensation time.

4. The vehicle of claim 3, wherein the control unit determines the second compensation time as a value of the average value of the authentication elapsed time minus a sum of the reference time and the first compensation time.

5. The vehicle of claim 1, wherein the control unit determines the authentication allowed time corresponding to the terminal information on the basis of the user information, compares the authentication allowed time with an elapsed time taken from a point in time at which the search signal is transmitted to a point in time at which the response signal is received, and authenticates the user time on the basis of a result of the comparison.

6. The vehicle of claim 5, wherein the control unit determines that a relay attack has occurred when the elapsed time exceeds the authentication allowed time.

7. The vehicle of claim 1, further comprising a storage unit, wherein the control unit controls the storage unit to store the generated user information.

8. The vehicle of claim 1, wherein the control unit determines whether to register the user terminal on the basis of the generated user information, and authenticates the user terminal on the basis of the generated user information in response to the user terminal being registered.

9. The vehicle of claim 1, further comprising an input unit, wherein a user is requested to tag the user terminal in response to a user terminal registration command received or in response to the user terminal not registered.

10. A method of controlling a vehicle, the method comprising:
   receiving a response signal including terminal information of a user terminal from the user terminal;
   determining an authentication allowed time for authenticating the user terminal on the basis of the terminal information;
   generating user information including the terminal information and the authentication allowed time corresponding to the terminal information; and
   authenticating the user terminal on the basis of the generated user information, wherein the determining of the authentication allowed time includes;
    determining a first compensation time on the basis of a pre-stored compensation time information for each user terminal model and the terminal information, and
    determining the authentication allowed time on the basis of the first compensation time, and
wherein the pre-stored compensation time information for each user terminal model includes a difference between an authentication required time for each user terminal model and a reference time of the vehicle.

11. The method of claim 10, wherein the reference time is determined on the basis of a type of the vehicle.

12. The method of claim 10, wherein the determining of the authentication allowed time includes:
    calculating an average value of each authentication elapsed time taken from a point in time at which a search signal is transmitted to a point in time at which the response signal is received;
    determining a second compensation time on the basis of the average value; and
    determining the authentication allowed time on the basis of the second compensation time.

13. The method of claim 12, wherein the determining of the second compensation time includes determining the second compensation time as a value of the average value of the authentication elapsed time minus a sum of the reference time and the first compensation time.

14. The method of claim 10, wherein the authenticating of the user terminal includes:
    determining the authentication allowed time corresponding to the terminal information on the basis of the user information;
    comparing the authentication allowed time with an elapsed time taken from a point in time at which the search signal is transmitted to a point in time at which the response signal is received; and
    authenticating the user time on the basis of a result of the comparison.

15. The method of claim 14, wherein the authenticating of the user terminal on the basis of the result of the comparison includes determining that a relay attack has occurred when the elapsed time exceeds the authentication allowed time.

16. The method of claim 10, further comprising
    storing the generated user information.

17. The method of claim 10, further comprising determining whether to register the user terminal on the basis of the generated user information,
    wherein the authenticating of the user terminal includes authenticating the user terminal on the basis of the generated user information in response to the user terminal registered.

18. The method of claim 10, further comprising
    requesting a user to tag the user terminal in response to a user terminal registration command received or in response to the user terminal not registered.

* * * * *